Aug. 7, 1934.　　　E. L. OPPERMAN　　　1,969,475

FILM GATE FOR MOTION PICTURE APPARATUS

Filed March 4, 1932

Inventor:
Emil L. Opperman,
By
Attorneys

Patented Aug. 7, 1934

1,969,475

UNITED STATES PATENT OFFICE 1,969,475

FILM GATE FOR MOTION PICTURE APPARATUS

Emil L. Opperman, Rochester, N. Y., assignor to Eastman Kodak Company, Rochester, N. Y., a corporation of New York Application March 4, 1932, Serial No. 596,798

11 Claims. (Cl. 88—17)

This invention relates to photography and more particularly to motion picture photography. One object of my invention is to provide a film gate into which a film can be readily threaded and by which film will be held in a fixed position. Another object of my invention is to provide a film gate comprising a relatively fixed gate member and a relatively movable gate member, the movement of the movable gate member being such that film may be threaded through the gate and such that the film aperture in the gate will always be properly located in the correct position. Another object of my invention is to provide a two-piece gate construction in which a movable member is permitted to move laterally over a fixed gate member but is not permitted to move longitudinally thereof. Still another object of my invention is to provide a film gate which is resiliently pressed towards a fixed gate member and which can be readily removed from the gate member by releasing a suitable latching device, and other objects will appear from the following specification, the novel features being particularly pointed out in the claims at the end thereof.

Coming now to the drawing wherein like reference characters denote like parts throughout:

Figure 1:
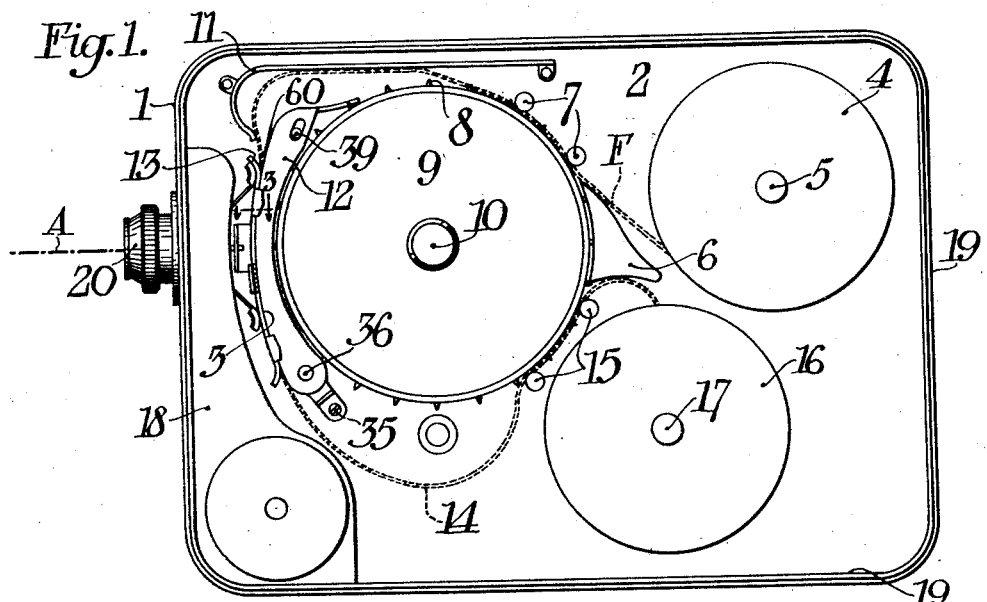
Fig. 1 is a side elevation of a motion picture machine including a gate constructed in accordance with and embodying a preferred form of my invention.

It is obvious that a large number of different types of motion picture machines require a film gate for holding film in a fixed position. This film gate may be used for holding the film in position for printing, for holding the film in position for exposure, or for holding the film in position for projecting. The same gate construction may be used for a variety of purposes, but for the purpose of illustrating my present invention I have shown the gate as forming a part of a motion picture camera.

As a typical example of my invention, the gate may form a part of a camera designated broadly as 1 which may consist of a mechanism plate 2 which forms a support for the gate member designated broadly as 3. The camera may be equipped with the usual film supply reel 4 mounted on a shaft 5 from which a film F may be led past the film guide 6 beneath film holding posts or rollers 7 which hold a short length of the film in contact with the teeth 8 of a sprocket 9 which may be turned by a power shaft 10.

After passing beneath the posts 7, the film F may be guided beneath a guideway 11 to the gate 3, this gate preferably consisting of a fixed section 12 and a movable section 13, as will be hereinafter more fully described. The film passes from the gate 3 in a loop 14 beneath a second pair of film retainers 15 which hold a length of film upon the sprocket 9 and thence the film passes to a take-up spool 16 which may be driven by a power shaft 17 in a well-known manner.

The pulldown mechanism, governor and other well-known parts of a motion picture camera may be enclosed in a housing 18. All of the parts above described are well known and may be included inside of walls 19 which extend around the edge of the supporting plate 2.

Figure 2:
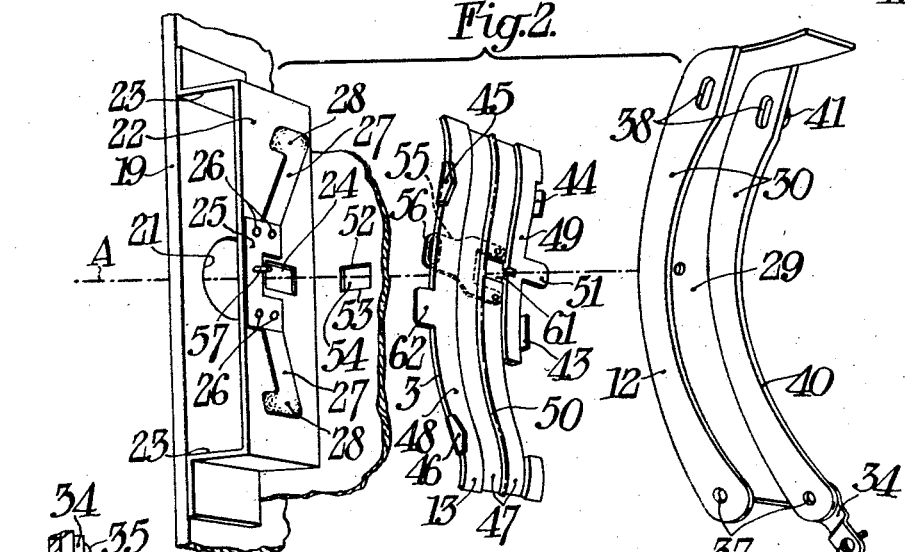
Fig. 2 is an enlarged fragmentary detail view showing the several parts of the film gate spaced from each other to better show their construction.

Coming now to my invention, the gate member designated broadly as 3, may consist of the parts shown in Fig. 2 separated from each other so as to better show their construction.

In the present embodiment of my invention, an objective may be mounted in the lens mount 20 and light may pass through the objective along the axis A.

Referring to Fig. 2, the front wall 19 of the camera may be provided with an aperture 21 through which light may pass along the axis A. A plate 22 supported by the legs 23 is spaced from wall 19 and is provided with an aperture 24 which is also centered on the axis A. This plate is provided with a leaf-spring 25, the spring being attached at 26 to the plate 22 and having arms 27 extending away from this plate and terminating in enlarged rounded end portions 28. These end portions are adapted to press against the movable gate section 13 normally thrusting this gate section toward the relatively fixed gate section 12.

The camera shown is used for making a series of exposures along one side of the median line of the film, the filled reel being then used as a supply reel for the making of a second series of exposures in the opposite direction along the other half of the film.

Figures 3, 4:
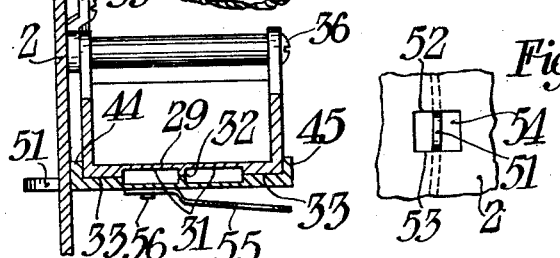
Fig. 3 is an enlarged detail sectional view taken on line 3—3 of Fig. 1.
Fig. 4 is a fragmentary view showing the locating lug and the locating walls on the supporting plate.

Gate section 12, as indicated in Fig. 2, is preferably made of a curved plate 29 with rearwardly extending flanges 30, these flanges serving to stiffen the curved plate so that it can not spring out of shape. The curved plate 29, as best shown in Fig. 3, is provided with a recessed film guideway 31 which is provided with a central rib 32 and edge ribs 33. The edge ribs are of sufficient width to engage and hold a film flat by pressing over the edges and the perforated portion of the film. The central rib 32 is a narrow one and has very small contact with the center of the film, since in the form of motion picture apparatus, shown in the drawing, a picture is only to be made on one-half of the film area at a time.

Gate section 12 is the fixed gate section, that is, this gate section is secured to the camera by means of a short bracket 34 which supports a screw 35 which is threaded into the support 2. At the same end there is a post 36 which extends up through the apertures 37 in the flanges 30 to more rigidly support the fixed member.

At the opposite ends of the flanges 30 there are a pair of elongated openings 38 adapted to position the upper end of the gate when these openings are passed over a post 39 which is fixedly mounted on the support 2.

It should be noticed that the flange 30 which is closest to the support 2 is spaced a slight distance from the support by means of the holding bracket 34 at one end which lies inside of the inner edge 40 of flange 30 and by washer 41 which likewise lies on the inner edge of the flange 30. The purpose of this spacing of the fixed gate member from the supporting plate 2 is that it provides an opening through which the holding flanges 43 and 44 of the movable gate member 3 may pass. As indicated in Fig. 3, these flanges limit the downward motion of the film F as it is loaded into the gate. The opposite edges of the film are held by the holding flanges 45 and 46 which are spaced on opposite sides of the gate member 3 from the holding flanges 43 and 44.

The movable gate member 3 is provided with a complementary face which cooperates with the film guiding face of the curved plate 29. Thus, the movable gate member is provided with a pair of recessed areas 47 which lie opposite the recessed areas 31 of plate 29 and plate 3 is further provided with film guiding strips 48 and 49 on opposite sides of a central rib 50. These areas, as best shown in Fig. 3, correspond to similar areas in the fixed gate section.

It should be noted that the two gate sections are each comparatively rigidly made of metal and that their cooperating faces are complementary in shape so that a film passing between the two gate sections will be held by accurately shaped film guiding faces.

The movable gate member 3 is normally held in the proper position in the following manner. The gate member 3 is provided with a projection or protuberance 51 which is of such length that it may engage the walls 52 and 53 of an aperture 54 cut in the support 2. This engagement prevents longitudinal movement of the gate section 3 relative to gate section 12, that is, the gate section cannot move towards either end of the fixed gate section. However, it should be noted that the protuberance 51 is of much less thickness than the width of the slot 54, and consequently, the movable gate member may move laterally of the fixed gate section and may slide freely to and from the gate section against the pressure of the curved ends 28 of the pressure arms 27. These spring arms resiliently thrust the gate member towards the fixed gate member with the film locating arms 43, 44, 45 and 46 in engagement with and embracing the side flanges 30.

On the back of the movable gate section 3, there is a spring latch formed by a spring member 55 which may be attached by rivets or otherwise to the movable gate section. This spring member 55 is provided with an elongated opening 56 adapted to engage a pin 57 carried by plate 2. The elongated opening in the spring insures the operator of rapidly bringing the movable gate section into its operable position and does not tend to locate the gate section relative to the support 2. This latch is merely for holding the movable gate section in place, and at the same time is for permitting the gate section to move for threading without becoming unlatched.

The operation of threading a camera or other motion picture apparatus equipped with a gate constructed in accordance with my invention is very simple. A film F having been properly threaded to the sprocket 9 may be inserted in the gate by merely pressing the gate against the action of the springs 27 through the insertion of an end of the film into the opening 60 at the top of the gate. As the film is entered in the opening 60, it can be pressed forwardly so that the movable gate section swings or slides upon its locating pin 51 in such a manner that the movable gate section separates from the fixed section a sufficient distance to permit the film to be entered edgewise. As soon as the film has been entered between the gate sections, the springs 27 cause the movable gate section 3 to move laterally and contact with the film, pressing it against the fixed gate section. This movement causes the film to lie between the complemental faces of the gate sections with the lugs 43, 44, 45 and 46 engaging opposite edges of the film and also engaging the flanges 30. Thus, the film is securely held in place by the two gate sections.

If it should be necessary to remove the movable section for cleaning the aperture 61 from emulsion or other particles of dirt which may accumulate, the latch spring 55 is pressed rearwardly releasing the pin 57, and the gate section may be moved laterally to release the lugs 43 and 44 from the flange 30, after which the handle 62 may be used for drawing the gate section sidewise away from the fixed gate section.

After cleaning, the movable section 3 may be readily returned to its initial position by entering the lug 51 in the aperture 54 and pressing the gate section downwardly until the spring 55 snaps over the pin 57. The gate section will then be automatically thrust into the proper position by the springs 27.

The shape of the spring ends 28 is elongated and curved since this shape clearly facilitates positioning the movable gate section after it has been removed from the camera.

While it is obvious that a number of embodiments of my invention may be made, departing somewhat from the showing of the preferred form in the drawing, I contemplate as within the scope of my invention all such forms as may come within the terms of the appended claims.

What I claim is:

1. In motion picture apparatus, the combination with a support, of a gate mounted on and perpendicular to said support and comprising a relatively fixed member spaced from said support, and a relatively movable member having lugs on each side adapted to engage the fixed member on both sides with one of said lugs movable in the space between said support and said fixed member, and cooperating parts on the movable member and said support on which said movable member may move to and from the fixed member.

2. In motion picture apparatus, the combination with a support, of a gate mounted on and perpendicular to said support and comprising a relatively fixed member spaced from said support, and a relatively movable member having lugs on each side adapted to engage the fixed member on both sides with one of said lugs movable in the space between said support and said fixed member, and contacting parts on the movable member and said support on which said movable member may move to and from the fixed member, said contacting parts also being adapted to prevent longitudinal movement of the movable member relative to the fixed member.

3. In motion picture apparatus, the combination with a support, of a gate mounted on said support and comprising a relatively fixed member spaced at its ends from said support, a relatively movable member having lugs on each side adapted to engage the fixed member on both sides forming a closed film guideway therewith, a pin and slot connection between the movable member and the support, said pin filling the slot in one direction, but sliding in the slot in another direction whereby the movable member may slide and rock on said pin in one direction but is held against movement in another direction.

4. In motion picture apparatus, the combination with a support, of a gate mounted on said support and comprising a relatively fixed member spaced at its ends from said support, a relatively movable member having lugs on each side adapted to engage the fixed member on both sides forming a closed film guideway therewith, a pin and slot connection between the movable member and the support, said pin filling the slot in one direction, but sliding in the slot in another direction, and a resilient latch for holding the movable member in place, said latch including a movable member to release the latch for the removal of the movable member.

5. In motion picture apparatus, the combination with a support, of a gate mounted on said support and comprising a relatively fixed member spaced at its ends from said support, a relatively movable member having lugs on each side adapted to engage the fixed member on both sides forming a closed film guideway therewith, means for locating the movable member relatively to the fixed member including a single pin and slot on the movable member and support, said pin and slot both being rectangular in shape, the pin being of the same height but of much less width than the slot whereby the movable member may move as the pin slides in the slot to and from the fixed member, movement longitudinally of the fixed member being prevented by the pin filling the height of the slot.

6. In motion picture apparatus, the combination with a support, of a gate mounted on and perpendicular to said support and comprising a fixed member having sides and including spacers holding a side of said member spaced from said fixed support and a movable member, means for definitely positioning the movable member relatively to the support, lugs on both sides of the movable member adapted to engage the fixed member, the lugs on one side being movable in the space between the support and said fixed member, springs tending to hold the gate members together, said definite positioning means holding the gate member against longitudinal movement and permitting lateral movement under the influence of said springs.

7. In motion picture apparatus, the combination with a support, of a gate mounted on and perpendicular to said support and comprising a fixed member having sides, spacers for holding a side of said fixed member spaced from said support and a movable member, means for initially positioning the movable member in an operative film holding position comprising a pin and slot connection with the support for initially locating the movable member longitudinally of the fixed member, and lugs on one member embracing the sides of the other member and movable in the space between the support and said fixed member for finally positioning the movable member relatively to the fixed one.

8. In motion picture apparatus, the combination with a support, of a gate mounted on said support and comprising a fixed and a movable member, a single connection between the movable member and support including a slot perpendicular to said fixed member and a pin cooperating with said slot to prevent longitudinal movement of the movable gate member with respect to the fixed gate member, and springs bearing on each side of the single connection for rocking the movable gate member into contact with the fixed gate member.

9. In motion picture apparatus, the combination with film moving mechanism and a light aperture, of a gate for holding a film in position across the light aperture, said gate comprising a relatively fixed member forming one gate member, a relatively movable member, complemental faces on said member adapted to hold a film therebetween, means for resiliently pressing the movable member toward said fixed member including an elongated spring, said spring having rounded elongated ends engaging said presser member, a latch for retaining the presser member in position and means for definitely locating said movable member to prevent its movement longitudinally of the fixed member, said means permitting rocking movement of said movable presser laterally of said fixed member.

10. In a motion picture apparatus, the combination with a support member, a fixed gate element which is perpendicular to said support member, a supporting means which is fixed perpendicularly to said support member and in spaced relation to said fixed gate element, a movable gate member between said fixed gate element and said supporting means, and a resilient means between said movable gate member and said supporting means and for moving said movable gate member toward said fixed gate element, of a connection between said support member and said movable gate member, permitting only perpendicular relative movement therebetween, and including a protuberance on one of said members, the other of said members being provided with a slot which engages said protuberance and which is larger than said protuberance in a direction perpendicular to said fixed gate element.

11. In a motion picture apparatus, the combination with a supporting plate, a fixed gate member which is perpendicular to said supporting plate, a supporting means which is fixed perpendicularly to said supporting plate and in spaced relation to said fixed gate member, a movable gate member between said fixed gate member and said supporting means, and a resilient means between said movable gate member and said supporting means and for moving said movable gate member toward said fixed gate member, of a tongue on said movable gate member, and said supporting plate being provided with a slot which engages said tongue to prevent longitudinal relative movement between said gate members and which is larger than said tongue in a direction perpendicular to said fixed gate member to permit relative movement in a perpendicular direction between said gate members.

EMIL L. OPPERMAN.